(12) United States Patent
Ishibashi

(10) Patent No.: US 12,735,270 B2
(45) Date of Patent: Sep. 15, 2026

(54) DEVICE AND METHOD FOR DETECTING LONGITUDINAL TEAR IN CONVEYOR BELT

(71) Applicant: THE YOKOHAMA RUBBER CO., LTD., Hiratsuka (JP)

(72) Inventor: Yusuke Ishibashi, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 248 days.

(21) Appl. No.: 18/709,951

(22) PCT Filed: Aug. 22, 2022

(86) PCT No.: PCT/JP2022/031552
§ 371 (c)(1),
(2) Date: May 14, 2024

(87) PCT Pub. No.: WO2023/132095
PCT Pub. Date: Jul. 13, 2023

(65) Prior Publication Data

US 2025/0011100 A1 Jan. 9, 2025

(30) Foreign Application Priority Data

Jan. 7, 2022 (JP) ................................. 2022-001712

(51) Int. Cl.
*B65G 43/02* (2006.01)
*G01S 13/75* (2006.01)

(52) U.S. Cl.
CPC .............. *B65G 43/02* (2013.01); *G01S 13/75* (2013.01)

(58) Field of Classification Search
None
See application file for complete search history.

(56) References Cited

U.S. PATENT DOCUMENTS 4,470,120 A 9/1984 Haylett
2008/0061972 A1 * 3/2008 Hwang ............ G06K 19/07381 340/568.2

(Continued)

FOREIGN PATENT DOCUMENTS

EP 3 919 775 A1 12/2021
JP S58-26715 A 2/1983

(Continued)

*Primary Examiner* — Bernarr E Gregory
*Assistant Examiner* — Brandon James Henson
(74) *Attorney, Agent, or Firm* — Carrier, Shende & Associates P.C.; Joseph P. Carrier; Fulchand P. Shende

(57) ABSTRACT

Embedded bodies embedded in a conveyor belt at intervals in a longitudinal direction each include a passive IC tag 3 disposed at one side portion in a width direction of the conveyor belt and a linear shaped detection element connected to the IC tag and extending from the one side portion to the other side portion to form a loop circuit. A transmission radio wave is emitted from a detector toward the IC tag, presence or absence of energization of the loop circuit is determined using information transmitted from the IC tag to the detector via a return radio wave emitted from the IC tag in response to the transmission radio wave, and in accordance with this determination result, presence or absence of generation of a longitudinal tear in the conveyor belt in a range where the loop circuit is embedded is detected.

9 Claims, 8 Drawing Sheets

(56) References Cited

U.S. PATENT DOCUMENTS

| | | | | |
|---|---|---|---|---|
| 2011/0024269 | A1* | 2/2011 | Wallace | B65G 15/36 198/810.02 |
| 2012/0217132 | A1 | 8/2012 | Twigger et al. | |
| 2019/0352097 | A1* | 11/2019 | Hou | B65G 15/64 |
| 2023/0159278 | A1 | 5/2023 | Ishibashi | |
| 2024/0327131 | A1* | 10/2024 | Campanari | B65G 17/126 |

FOREIGN PATENT DOCUMENTS

| | | | |
|---|---|---|---|
| JP | 2016-204070 | A | 12/2016 |
| JP | 6741889 | B2 | 8/2020 |
| WO | 2022/004055 | A1 | 1/2022 |

* cited by examiner

DEVICE AND METHOD FOR DETECTING LONGITUDINAL TEAR IN CONVEYOR BELT

TECHNICAL FIELD

The present invention relates to a device and method for detecting a longitudinal tear in a conveyor belt and particularly relates to a detection device and method that can accurately detect presence or absence of generation of a longitudinal tear in a conveyor belt with high versatility and at low cost.

BACKGROUND ART

A conveyor belt that runs around a conveyor device transports various conveyed objects to a conveying destination. Since various conveyed objects are fed onto the conveyor belt, a crack extending in a longitudinal direction (a so-called longitudinal tear) of the conveyor belt may be generated due to the conveyed objects or the like. Various devices that detect such a longitudinal tear in the conveyor belt have been proposed.

To detect a longitudinal tear generated in a conveyor belt, for example, a known proposed system includes loop coils embedded in the conveyor belt and a detection device disposed near the conveyor belt (see Patent Document 1). In this system, an induced current flows through the loop coils passing through a high frequency magnetic field formed by high frequency waves transmitted from a transmission unit of the detection device, and the induced current generates induced electromotive force in a reception unit of the detection device. When the loop coils are damaged, no induced electromotive force is generated in the reception unit, and thus presence or absence of generation of a longitudinal tear is determined by presence or absence of generation of this induced electromotive force.

However, the detection device that emits high frequency waves to detect induced electromotive force is expensive. The loop coils that are special products (exclusive parts) are also expensive, and it is difficult to embed many loop coils in the conveyor belt, which is disadvantageous in accurately detecting the generation of the longitudinal tear. Furthermore, when the intensity of high frequency waves to be emitted is increased, an induced current may flow even if the loop coils are damaged, and thus a longitudinal tear may be erroneously detected. Thus, there is room for improvement in accurately detecting presence or absence of generation of a longitudinal tear in the conveyor belt with high versatility and at low cost.

CITATION LIST

Patent Literature

Patent Document 1: JP 2016-204070 A

SUMMARY OF INVENTION

Technical Problem

An object of the present invention is to provide a device and method for detecting a longitudinal tear in a conveyor belt that can accurately detect presence or absence of generation of a longitudinal tear in a conveyor belt with high versatility and at low cost.

Solution to Problem

To achieve the object described above, a device for detecting a longitudinal tear in a conveyor belt according to an embodiment of the present invention includes: an embedded body embedded in the conveyor belt; a detector configured to wirelessly communicate with the embedded body without contacting the conveyor belt; and a calculation unit connected to the detector. In the device, the embedded body includes an integrated circuit (herein after "IC") tag that is passive and a detection element connected to the IC tag, extending in a width direction of the conveyor belt outside the IC tag to form a loop circuit, and having a linear shape. A transmission radio wave is emitted from the detector toward the IC tag, presence or absence of energization of the loop circuit is determined by the calculation unit by using information transmitted from the IC tag to the detector via a return radio wave emitted from the IC tag in response to the transmission radio wave, and in accordance with this determination result, presence or absence of generation of a longitudinal tear in the conveyor belt in a range where the loop circuit is embedded is detected.

A method for detecting a longitudinal tear in a conveyor belt according to an embodiment of the present invention uses an embedded body embedded in the conveyor belt, a detector configured to wirelessly communicate with the embedded body without contacting the conveyor belt, and a calculation unit connected to the detector. The embedded body includes an IC tag that is passive and a detection element connected to the IC tag, extending in a width direction of the conveyor belt outside the IC tag to form a loop circuit, and having a linear shape. The method includes: emitting a transmission radio wave from the detector toward the IC tag; determining, by the calculation unit, presence or absence of energization of the loop circuit by using information transmitted from the IC tag to the detector via a return radio wave emitted from the IC tag in response to the transmission radio wave, and detecting, in accordance with this determination result, presence or absence of generation of a longitudinal tear in the conveyor belt in a range where the loop circuit is embedded.

Advantageous Effects of Invention

According to an embodiment of the present invention, the embedded body has a simple configuration including the IC tag that is passive and the detection element connected to the IC tag, extending in the width direction of the conveyor belt outside the IC tag to form the loop circuit, and having a linear shape. Thus, the embedded body can be made up of general-purpose parts, which is advantageous to reduce costs. It is only required that the detector have specifications allowing for wireless communication with the embedded body, and the detector can be made up of general-purpose parts, which is advantageous to reduce costs.

When the loop circuit is embedded at the position where a longitudinal tear has been generated in the conveyor belt, the loop circuit breaks. Accordingly, in the IC tag to which the detection element forming the loop circuit is connected, presence or absence of energization of the loop circuit can be grasped. Thus, using the information from the IC tag transmitted via the return radio wave to the detector allows presence or absence of energization of the loop circuit to be accurately determined by the calculation unit. Therefore, presence or absence of generation of a longitudinal tear in the conveyor belt in the range where the loop circuit is embedded can be accurately determined in accordance with this determination result. With the cost reduction of the embedded body, an embedding pitch of the embedded body on the conveyor belt can be sufficiently decreased compared to a known loop antenna or the like, which is more advantageous in accurately detecting presence or absence of generation of a longitudinal tear.

DESCRIPTION OF EMBODIMENTS

Figure 1:
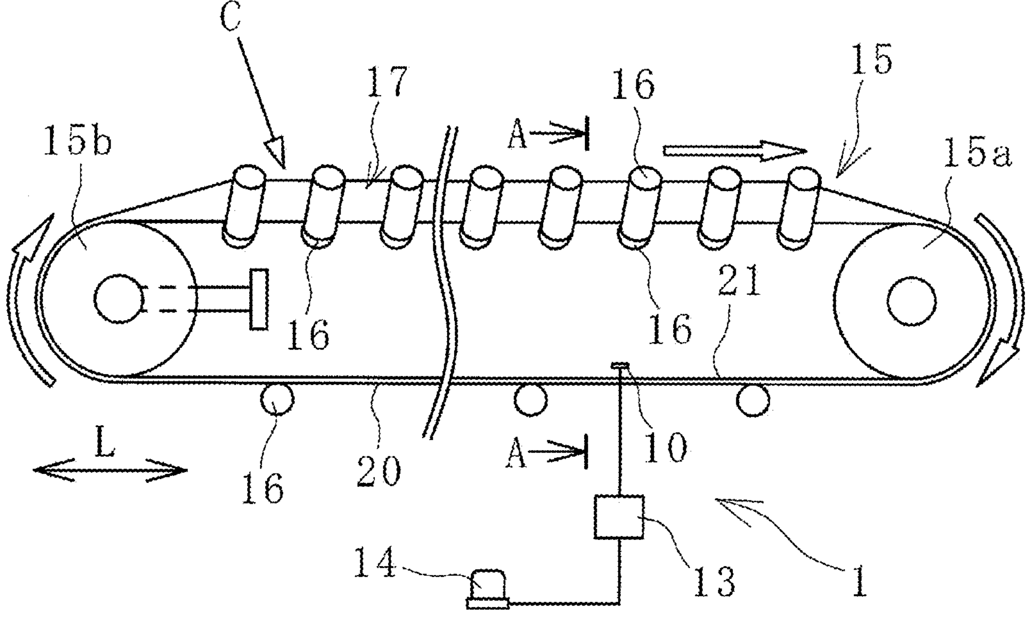
FIG. 1 is an explanatory diagram illustrating a device for detecting a longitudinal tear in a conveyor belt according to an embodiment of the present invention, which is disposed on a conveyor device, in a side view of the conveyor belt.
Figure 2:
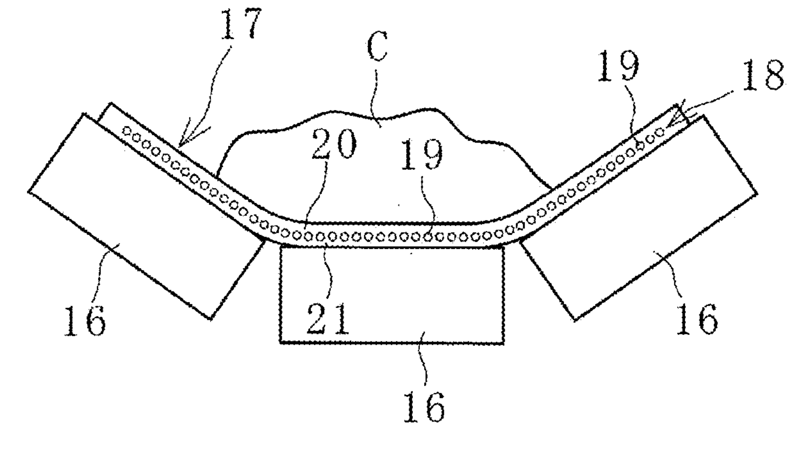
FIG. 2 is a cross-sectional view taken along a line A-A of FIG. 1.
Figure 2:
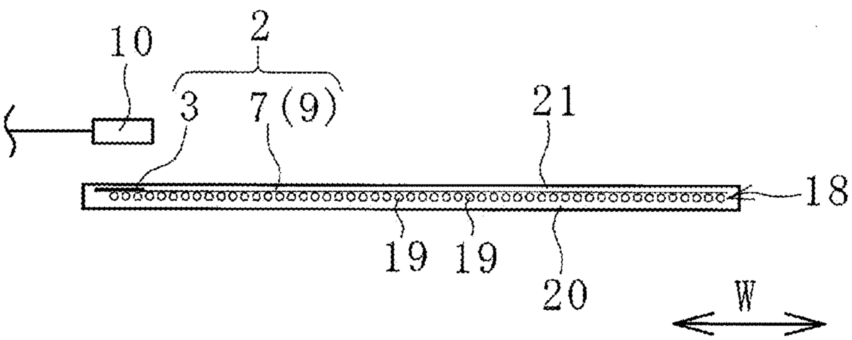
Figure 3:
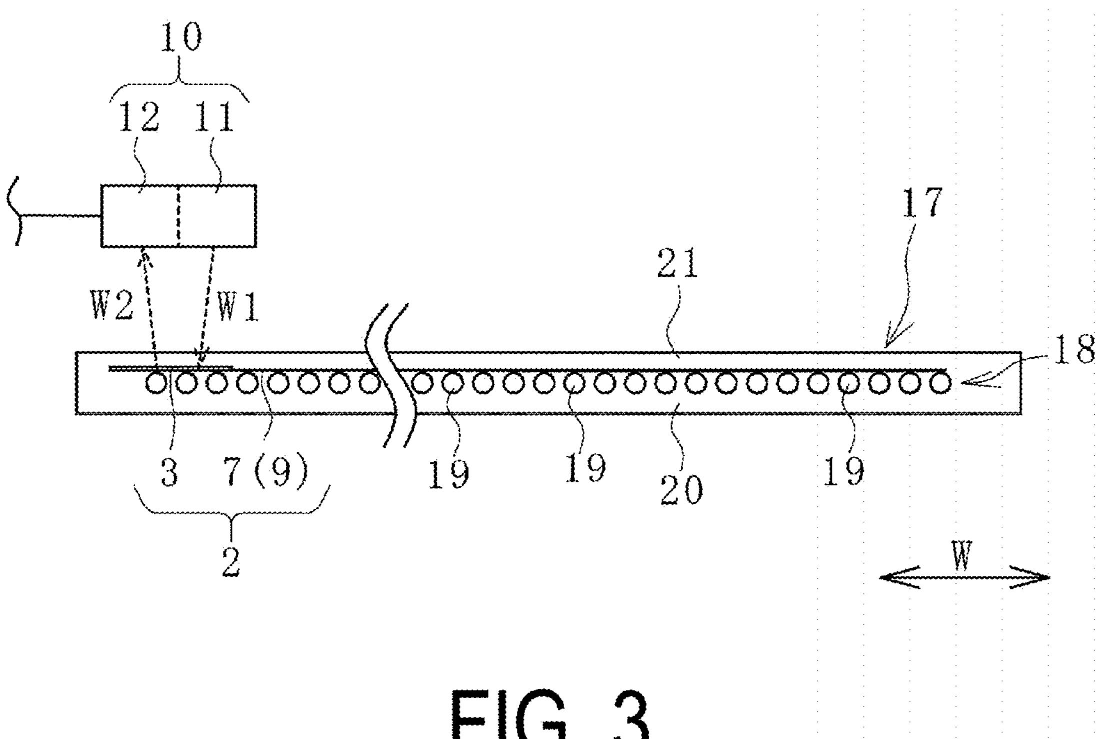
FIG. 3 is an explanatory diagram illustrating the conveyor belt of FIG. 1 in an enlarged cross-sectional view.

A detection device and method for a longitudinal tear in a conveyor belt according to an embodiment of the present invention will be described below based on embodiments illustrated in the drawings.

Figure 4:
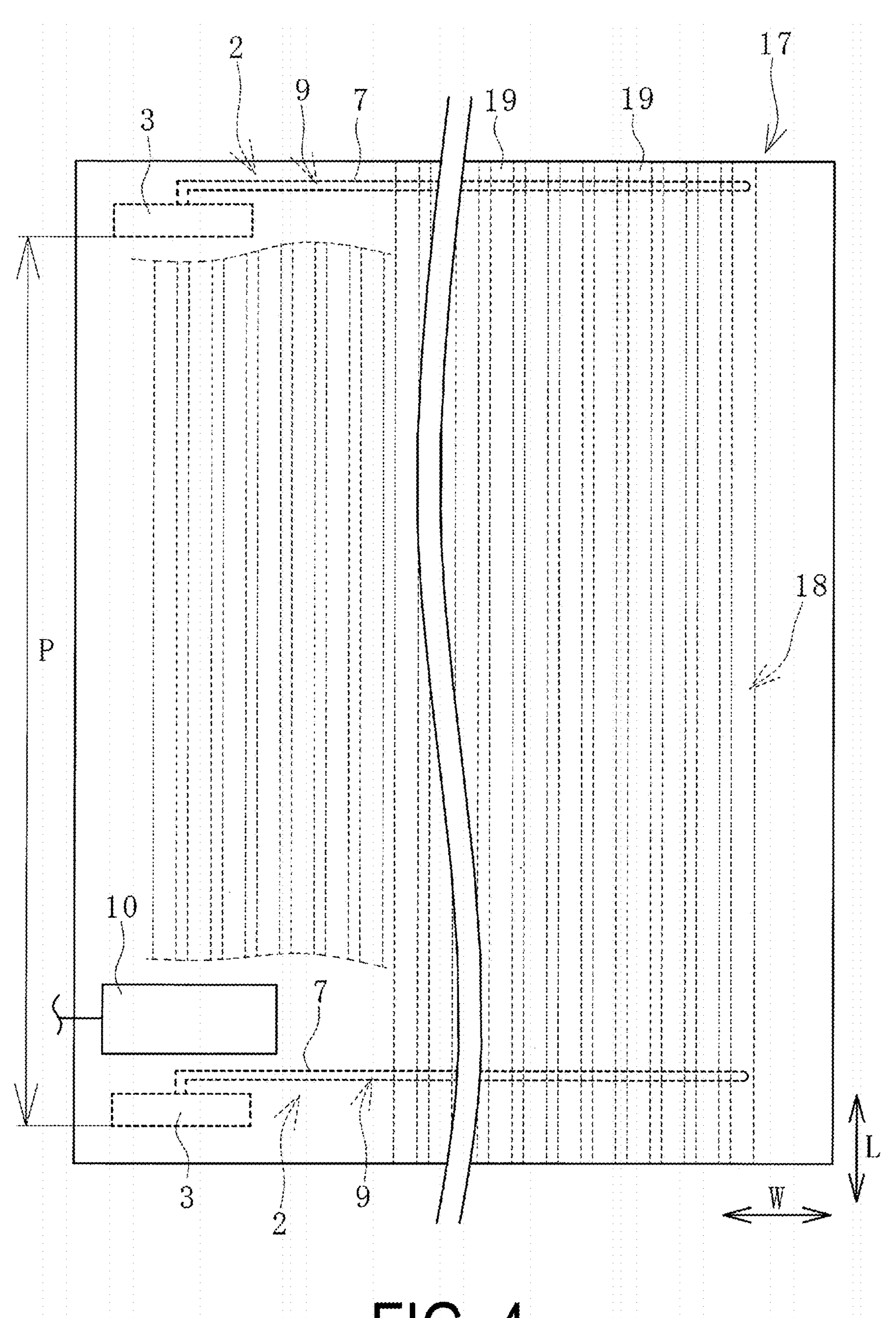
FIG. 4 is an explanatory diagram illustrating the conveyor belt of FIG. 3 in a plan view.

A detection device 1 for a longitudinal tear in a conveyor belt, illustrated in FIGS. 1 to 4 (hereinafter, referred to as a detection device 1), is placed on a conveyor device 15 and is configured to detect generation of a crack (so-called longitudinal tear) extending in a longitudinal direction L of a conveyor belt 17. In the drawings, an arrow L indicates a longitudinal direction of the conveyor belt 17, and an arrow W indicates a width direction of the conveyor belt 17. In FIG. 4, steel cords 19 are omitted in a partial range.

The conveyor device 15 includes a pair of pulleys 15*a* and 15*b* and the conveyor belt 17 mounted between the pair of pulleys 15*a* and 15*b*. The conveyor belt 17 is supported by a number of support rollers 16 between the pulleys 15*a* and 15*b*.

The conveyor belt 17 is formed integrally of an upper cover rubber 20, a lower cover rubber 21, and a core layer 18 disposed between the upper cover rubber 20 and the lower cover rubber 21. The core layer 18 is formed such that a large number of the steel cords 19 extending in the longitudinal direction L are disposed side by side in the width direction W, and the steel cords 19 are joined to each other via coating rubber (adhesive rubber). The core layer 18 is not limited to the steel cords 19 and may be a fiber layer formed of canvas or the like. The conveyor belt 17 includes other members as necessary.

On the carrier side of the conveyor device 15 (on the upper side in FIGS. 1 and 2), the lower cover rubber 21 of the conveyor belt 17 is supported by the support rollers 16, and thus a central portion in the width direction W of the conveyor belt 17 is formed into a trough shape protruding downward. A conveyed object C is fed onto an upper surface of the upper cover rubber 20 to be transported. On the return side of the conveyor device 15 (on the lower side in FIGS. 1 and 2), the upper cover rubber 20 of the conveyor belt 17 is supported in a flat state by the support rollers 16.

The detection device 1 includes embedded bodies 2 embedded in the conveyor belt 17, a detector 10, and a calculation unit 13. In this embodiment, a warning device 14 is further provided. The warning device 14 may be optionally provided. The embedded bodies 2 each have a passive IC tag 3 and a linear detection element 7 connected to the IC tag 3. The detector 10 includes a transmission unit 11 and a reception unit 12.

Figure 5:
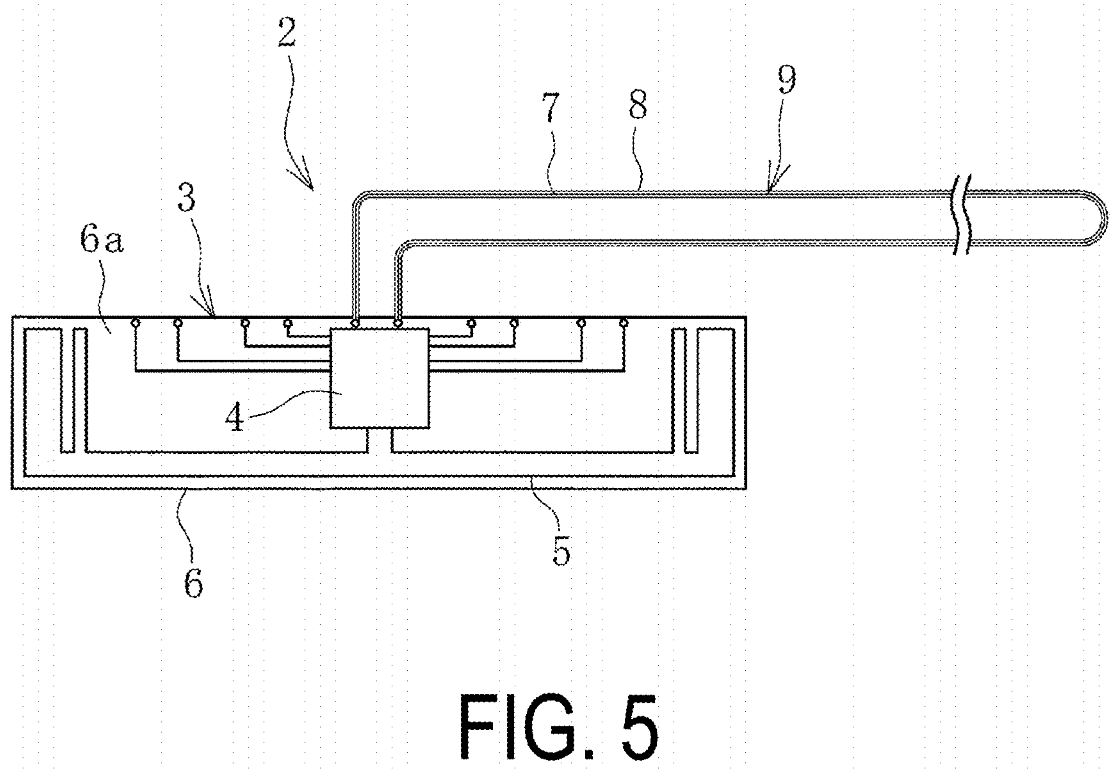
FIG. 5 is an explanatory diagram illustrating an embedded body of FIG. 4 in a plan view.
Figure 6:
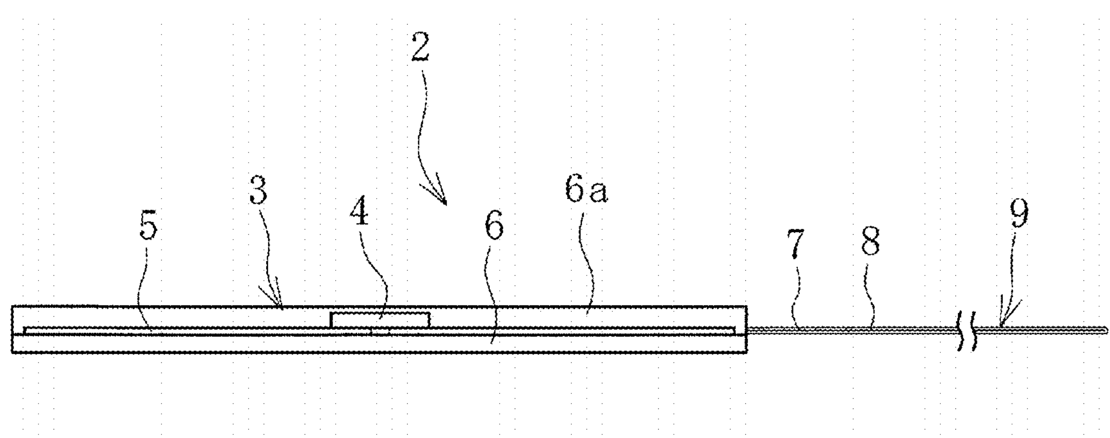
FIG. 6 is an explanatory diagram illustrating the embedded body of FIG. 4 in a front view.

As illustrated in FIGS. 5 and 6, the IC tag 3 includes an IC chip 4 and an antenna unit 5 connected to the IC chip 4. The IC chip 4 and the antenna unit 5 are disposed on a substrate 6. The IC chip 4 and the antenna unit 5 are covered with an insulating layer 6*a*, and the entire IC tag 3 is electrically insulated from the outside. However, the IC tag 3 and the detection element 7 are electrically conductively connected to each other. The insulating layer 6*a* is formed of a known insulating material such as insulating rubber, resins such as polyester, and natural fibers.

The IC chip 4 arbitrarily stores tag unique information such as an identification number of the IC tag 3, element identification information for specifying the detection element 7 connected to the IC tag 3, and other necessary information. Although various types of known antennas can be used as the antenna unit 5, a dipole antenna extending left-right symmetrically from the IC chip 4 is employed in this embodiment. The antenna unit 5 is appropriately folded back so as to increase the extension length in a limited space.

The commonly distributed specifications are adopted for the IC tag 3, and for example, an RFID tag can be used. The IC tag 3 has, for example, an area of 2 $cm^2$ or more and 70 $cm^2$ or less, more preferably 3 $cm^2$ or more and 34 $cm^2$ or less, and further more preferably 3 $cm^2$ or more and 27 $cm^2$ or less, and preferably has a thickness of 0.5 mm or less, for example, 0.01 mm or more and 0.4 mm or less, and more preferably 0.03 mm or more and 0.15 mm or less. As just described, the size of the IC tag 3 is made as small as possible and the heat resisting temperature is specified to be about 200° C.

The detection element 7 extends in the width direction W of the conveyor belt 17 outside the connected IC tag 3 to form a loop circuit 9. The detection element 7 (the loop circuit 9) preferably extends to cover the entire width of the core layer 18. The detection element 7 is a linear member having conductivity and is formed of a known material such as conductive rubber, conductive paste, or a metal wire. The detection element 7 has an outer diameter of, for example, approximately, 0.5 mm or more and 2.0 mm or less. The detection element 7 may be a simple wire having a circular cross-section but may be a flat linear member (band-like wire).

The outer peripheral surface of the detection element 7 is covered by an insulator 8, and the detection element 7 is electrically insulated from the outside. The insulator 8 is formed of a known insulating material in the same way as the insulating layer 6*a*.

One end portion and the other end portion of the detection element 7 in the longitudinal direction are electrically connected to the IC chip 4. The IC tag 3 (the substrate 6) is provided with a large number of pairs of terminals connected to the IC chip 4. Each of one end portion and the other end portion of the detection element 7 in the longitudinal direction is connected to the pair of terminals and thus is electrically connected to the IC chip 4. The detection element 7 and the pair of terminals are connected by using an eyelet and a crimp terminal or by using a conductive adhesive, welding, solder, or the like. In this embodiment, five pairs of terminals are provided; however, the number of pairs of terminals provided on the IC tag 3 (the substrate 6) is not particularly limited and may be one pair of terminals. Since a space is restricted, the number of pairs of terminals provided on one IC tag 3 (substrate 6) is, for example, about one to six pairs of terminals.

A number of the embedded bodies 2 are embedded at intervals P (embedding pitches P) in the longitudinal direction L in the conveyor belt 17. It is preferable that each IC tag 3 is embedded in an end portion of the conveyor belt 17 in the width direction. In this embodiment, each IC tag 3 is embedded in one end portion of the conveyor belt 17 in the width direction, and the detection element 7 (the loop circuit 9) extends to the other end portion of the core layer 18 in the width direction. The IC tags 3 can also be embedded in one end portion and the other end portion in the width direction in a dispersed manner (for example, in a staggered arrangement).

The IC tag 3 may be embedded in a central portion in the width direction W of the conveyor belt 17, and the detection element 7 (the loop circuit 9) may extend toward both end portions in the width direction. However, the IC tag 3 is embedded in the end portion of the conveyor belt 17 in the width direction, which is advantageous to protect the IC tag 3 from an impact or the like due to the conveyed object C. In this embodiment, the IC tags 3 (the embedded body 2) is embedded in the lower cover rubber 21, but may be embedded in the upper cover rubber 20. To protect the IC tags 3 from an impact or the like due to the conveyed object C, the embedded body 2 is preferably embedded in the lower cover rubber 21 rather than the upper cover rubber 20.

The commonly distributed specifications that allow wireless communication with a passive RFID tag or the like are adopted for the detector 10. Thus, the IC tag 3 and the detector 10 constitute a radio frequency identification (RFID) system.

The detector 10 is disposed at a position near the conveyor belt 17 to wirelessly communicate with each of the embedded bodies 2 (the IC tags 3) without contacting the conveyor belt 17. The transmission unit 11 constituting the detector 10 emits a transmission radio wave W1 toward the IC tag 3. The reception unit 12 constituting the detector 10 receives a return radio wave W2 emitted from the IC tag 3 in response to the transmission radio wave W1. The information stored in the IC chip 4 is transmitted via the return radio wave W2 and received by the reception unit 12 to be acquired by the detector 10.

The frequency of radio waves used in wireless communication in the present invention is mainly an UHF band (different from country to country, but in the range of 860 MHz or higher and 930 MHz or lower; 915 MHz or higher and 930 MHz in Japan), and an HF band (13.56 MHz) can also be used. The radio wave used may be a linearly polarized wave or a circularly polarized wave.

The embedding pitch P of the embedded bodies 2 is preferably in the range of 5 m or more and 20 m or less and is more preferably an equal pitch. It is appropriate that the embedding pitch P of the embedded bodies 2 is approximately 10 m in consideration of detection accuracy of a longitudinal tear and costs. Note that in the drawings, the embedding pitch P is illustrated shorter than the real embedding pitch P.

In this embodiment, the detector 10 is disposed on the return side of the conveyor device 15 but may be disposed on the carrier side. The distance between the detector 10 and the IC tag 3 (the antenna unit 5) when they are closest to each other is set within 1 m, for example. In other words, the detector 10 is preferably placed at a position where the distance between the detector 10 and the IC tag 3 (the antenna unit 5) is 1 m or less when the IC tag 3 (the antenna unit 5) passes in front of the detector 10.

The calculation unit 13 is connected by wire or wirelessly to the detector 10. A known computer or the like is used as the calculation unit 13. Information acquired by the detector 10 is input into the calculation unit 13. Embedded position data (at least position data in the longitudinal direction L) of each IC tag 3 in the conveyor belt 17 is stored in the calculation unit 13 in association with tag unique information for specifying each IC tag 3. Furthermore, position information (at least position data in the longitudinal direction L) of each detection element 7 (the loop circuit 9 formed by each detection element 7) for the IC tag 3 connected is stored in the calculation unit 13 in association with element identification information for specifying each detection element 7.

Examples of the warning device 14 can include an alarm, a warning lamp, and an alarm indicator. The warning device 14 is connected by wire or wirelessly to the calculation unit 13, and the operation of the warning device 14 is controlled by the calculation unit 13. When determining that a longitudinal tear has been generated, the calculation unit 13 activates the warning device 14.

In manufacturing the conveyor belt 17, the embedded bodies 2 are disposed in the lower cover rubber 21 having not been vulcanized or the upper cover rubber 20 having not been vulcanized, in a molding step; thereafter, through a vulcanization step, the embedded bodies 2 embedded in the conveyor belt 17 are integrated with the lower cover rubber 21 or the upper cover rubber 20. To improve working efficiency in the molding step, for example, a unit in which the embedded body 2 is sandwiched between upper and lower unvulcanized rubber sheets may be formed in advance, and this unit may be disposed in the lower cover rubber 21 or the upper cover rubber 20 in the molding step.

The steel cord 19 greatly affects the state of radio wave communication between the detector 10 and the IC tag 3. Accordingly, when the core layer 18 is formed of a large number of the steel cords 19 disposed side by side in the width direction, the embedding direction of the IC tag 3 is set to a specific direction in which the intensity of the return radio wave W2 received by the detector 10 is higher than a predetermined threshold value.

Accordingly, the relationship between the embedding direction of the IC tag 3 and the intensity of the return radio wave W2 received by the detector 10 is grasped in advance by performing a preliminary test or the like. For example, test products are produced in which the IC tags 3 are embedded in different embedding directions in the conveyor belt 17 or a cut sample of the conveyor belt 17. The detector 10 is placed at a position right above the IC tag 3 of each of the test products, and the transmission radio wave W1 is emitted from the transmission unit 11 toward the IC tag 3. Then, the intensity of the return radio wave W2 emitted from the IC tag 3 in response to the transmission radio wave W1 and received by the reception unit 12 is measured to grasp the relation between the embedding direction of the IC tag 3 and the intensity of the return radio wave W2. Thereafter, the embedding direction in which the intensity of the return radio wave W2 received by the detector 10 is higher than a predetermined threshold value is specified. This threshold value may be set to a value at which stable wireless communication can be practically performed between the detector 10 and the IC tag 3.

In embedding the IC tag 3 in the conveyor belt 17, the IC tag 3 is embedded in the specified embedding direction. In this embodiment, since a dipole antenna is used as the antenna unit 5, as illustrated in FIGS. 4 and 5, the IC tag 3 is embedded in the conveyor belt 17 such that the left-right direction in which the antenna unit 5 extends in a plan view is orthogonal to the extension direction of the steel cord 19 (i.e., the longitudinal direction L). Adopting such an embedding direction makes the state of communication between the detector 10 and the IC tag 3 satisfactory, allowing for stable wireless communication (allowing for the longer communicable distance).

In a case where the core layer 18 is a fiber layer made of canvas or the like, the core layer 18 does not greatly affect the state of radio wave communication between the detector 10 and the IC tag 3. Consequently, it is not necessary to strictly specify the embedding direction of the IC tag 3, but it is preferable to specify the embedding direction as described above.

Since the embedded position and embedding direction of the IC tag 3 on the conveyor belt 17 are determined, a linearly polarized wave rather than a circularly polarized wave is more preferably used to improve the state of wireless communication between the detector 10 and the IC tag 3. In this case, the detector 10 is disposed such that the direction of the linearly polarized wave (the direction of the vertically polarized wave) coincides with (i.e., is parallel to) the left-right direction in which the antenna unit 5 extends and that the detector 10 and the IC tag 3 face each other when the traveling IC tag 3 passes in front of the detector 10. Also, in a case where the circularly polarized wave is used, the detector 10 may be disposed such that the detector 10 and the IC tag 3 face each other when the traveling IC tag 3 passes in front of the detector 10.

Next, an example of a procedure of a method for detecting presence or absence of generation of a longitudinal tear by using the detection device 1 will be described.

As illustrated in FIGS. 1 to 4, while the conveyor device 15 is in operation (while the conveyor belt 17 is running), the detector 10 emits the transmission radio wave W1 from the transmission unit 11 toward the IC tag 3 (the antenna unit 5) passing in front of the detector 10. When receiving the transmission radio wave W1, the IC tag 3 emits the return radio wave W2 to the reception unit 12 in response to the transmission radio wave W1.

Specifically, when the embedded body 2 (the loop circuit 9) is healthy, electricity is input into the IC chip 4 via the transmission radio wave W1 received by the antenna unit 5 to activate the IC chip 4. When the IC chip 4 is activated, electricity flows from one end portion of the detection element 7 through the loop circuit 9 to the other end portion of the detection element 7 to be input into the IC chip 4. As a result, the IC chip 4 recognizes that the loop circuit 9 is energized. Then, the tag unique information of the IC tag 3 stored in the IC chip 4 and the element identification information of the detection element 7 forming the loop circuit 9 are called. Thereafter, when the return radio wave W2 is emitted from the antenna unit 5, the tag unique information of the IC tag 3 and the element identification information of the detection element 7 that have been called are transmitted via the return radio wave W2 to be received by the reception unit 12.

The reception unit 12 receives the return radio wave W2 to acquire the information (tag unique information and element identification information) transmitted from the IC chip 4 via the return radio wave W2. The information (tag unique information and element identification information) acquired by the detector 10 is input into the calculation unit 13. The calculation unit 13 uses the acquired tag unique information of each IC tag 3 to specify the embedded position information on the conveyor belt 17 of the IC tag 3 associated with the tag unique information stored in advance. The calculation unit 13 uses the acquired element identification information of each detection element 7 to specify the position information, for the IC tag 3 connected, of the detection element 7 (the loop circuit 9 formed by the detection element 7) associated with the element identification information stored in advance.

As just described, the calculation unit 13 determines that the detection element 7 whose position information for the IC tag 3 connected is specified is healthy and that the loop circuit 9 formed by the detection element 7 is energized. In addition, since the embedded position information on the conveyor belt 17 of the IC tag 3 to which the detection element 7 is connected is specified, the embedding range in the conveyor belt 17 of the loop circuit 9 formed by the detection element 7 can be specified. As a result, the calculation unit 13 determines that a longitudinal tear in the conveyor belt 17 has not been generated in the specified embedding range of the loop circuit 9. In other words, in this case, the generation of a longitudinal tear is not detected.

In a case where a longitudinal tear has been generated in the conveyor belt 17, the loop circuit 9 breaks in the range where the longitudinal tear has been generated. In this case, even when electricity is input into the IC chip 4 via the transmission radio wave W1 received by the antenna unit 5 and the IC chip 4 is activated, the electricity does not flow through the loop circuit 9, and thus the IC chip 4 recognizes that the loop circuit 9 is not energized. Accordingly, even though the tag unique information of the IC tag 3 stored in the IC chip 4 is called, the element identification information of the detection element 7 forming the loop circuit 9 is not called. In addition, when the return radio wave W2 is emitted from the antenna unit 5, the called tag unique information of the IC tag 3 is transmitted via the return radio wave W2 to be received by the reception unit 12; however, the element identification information of the detection element 7 forming the loop circuit 9 is not received by the reception unit 12.

In other words, the information (tag unique information) acquired by the detector 10 is input into the calculation unit 13, and the calculation unit 13 uses the acquired tag unique information of each IC tag 3 to specify the embedded position information on the conveyor belt 17 of the IC tag 3 associated with the tag unique information stored in advance. However, since the element identification information of the detection element 7 connected to the IC tag 3 does not exist, it is determined that the loop circuit 9 formed by the detection element 7 is damaged. In other words, in this case, the generation of a longitudinal tear is detected.

Additionally, in a case where the IC tag 3 is damaged due to the generation of a longitudinal tear or the like, the reception unit 12 receives neither the tag unique information of the IC tag 3 nor the element identification information of the detection element 7 connected to the IC tag 3 even through the transmission radio wave W1 is emitted from the transmission unit 11 to the IC tag 3. As a result, it can be determined that a defect has occurred in the conveyor belt 17.

When it is determined that a longitudinal tear has been generated, the warning device 14 is activated, and the generation of a longitudinal tear is notified to the surroundings. Since the embedded position information on the conveyor belt 17 of the IC tag 3 from which the element identification information of the connected detection element 7 cannot be acquired is specified, the position (range) of the conveyor belt 17 where the longitudinal tear has been generated is determined by the specified embedded position information.

The administrator who has recognized the generation of a longitudinal tear stops running of the conveyor belt 17 at an appropriate timing and handles the longitudinal tear, for example, by repairing the range in which the longitudinal tear has been generated. Running of the conveyor belt 17 is resumed after such handling is completed.

The detection device 1 has a simple configuration in which the embedded body 2 includes the passive IC tag 3 and the linear detection element 7 connected to the IC tag 3 and extending in the width direction W of the conveyor belt 17 to form the loop circuit 9. Thus, the embedded body 2 can be made up of general-purpose parts, which is advantageous to reduce costs. It is only required that the detector 10 have specifications allowing for wireless communication with the embedded body 2, and the detector 10 can be made up of general-purpose parts, which is advantageous to reduce costs.

As described above, using the information from the IC tag 3 transmitted via the return radio wave W2 to the detector 10 allows presence or absence of energization of the loop circuit 9 to be accurately determined by the calculation unit 13. Therefore, presence or absence of generation of a longitudinal tear in the conveyor belt 17 in the range where the loop circuit 9 is embedded can be accurately determined in accordance with the determination result of presence or absence of energization of the loop circuit 9. With the cost reduction of the embedded body 2, the embedding pitch P of the embedded body 2 on the conveyor belt 17 can be sufficiently decreased compared to a conventional loop antenna or the like, which is more advantageous to accurately detect presence or absence of generation of a longitudinal tear.

The detection element 7 (the loop circuit 9) may extend not only in parallel with the width direction W but also in an inclined manner in the front-back direction (longitudinal direction L) with respect to the width direction W. The detection element 7 (the loop circuit 9) extends in an inclined manner as just described, which is advantageous to further reduce changes in bending rigidity (to smoothly change bending rigidity) when the conveyor belt 17 passes through the surroundings of the pulleys 15*a* and 15*b*, compared to a case where the detection element 7 extends in parallel with the width direction W (the inclination angle is zero). Using, as the detection element 7, conductive rubber or conductive paste, which has lower rigidity than a metal wire, allows the bending rigidity when the conveyor belt 17 passes through the surroundings of the pulleys 15*a* and 15*b* to be further reduced.

If the detection element 7 is made of a thin wire having a simple circular cross-section, even though no longitudinal tear is generated when a sharp conveyed object C is fed onto the conveyor belt 17, the detection element 7 may be cut by the sharp portion of the conveyed object C. Accordingly, the loop circuit 9 formed by the detection element 7 is damaged even though no longitudinal tear is actually generated, and thus the calculation unit 13 determines that a longitudinal tear has been generated, resulting in erroneous detection.

As a result, it is preferable to use a flat linear member (band-like wire) as the detection element 7. The use of the band-like detection element 7 in a plan view is advantageous to avoid the aforementioned erroneous detection. The width of the flat detection element 7 is, for example, about 5 mm or more and 10 mm or less.

Figure 7:
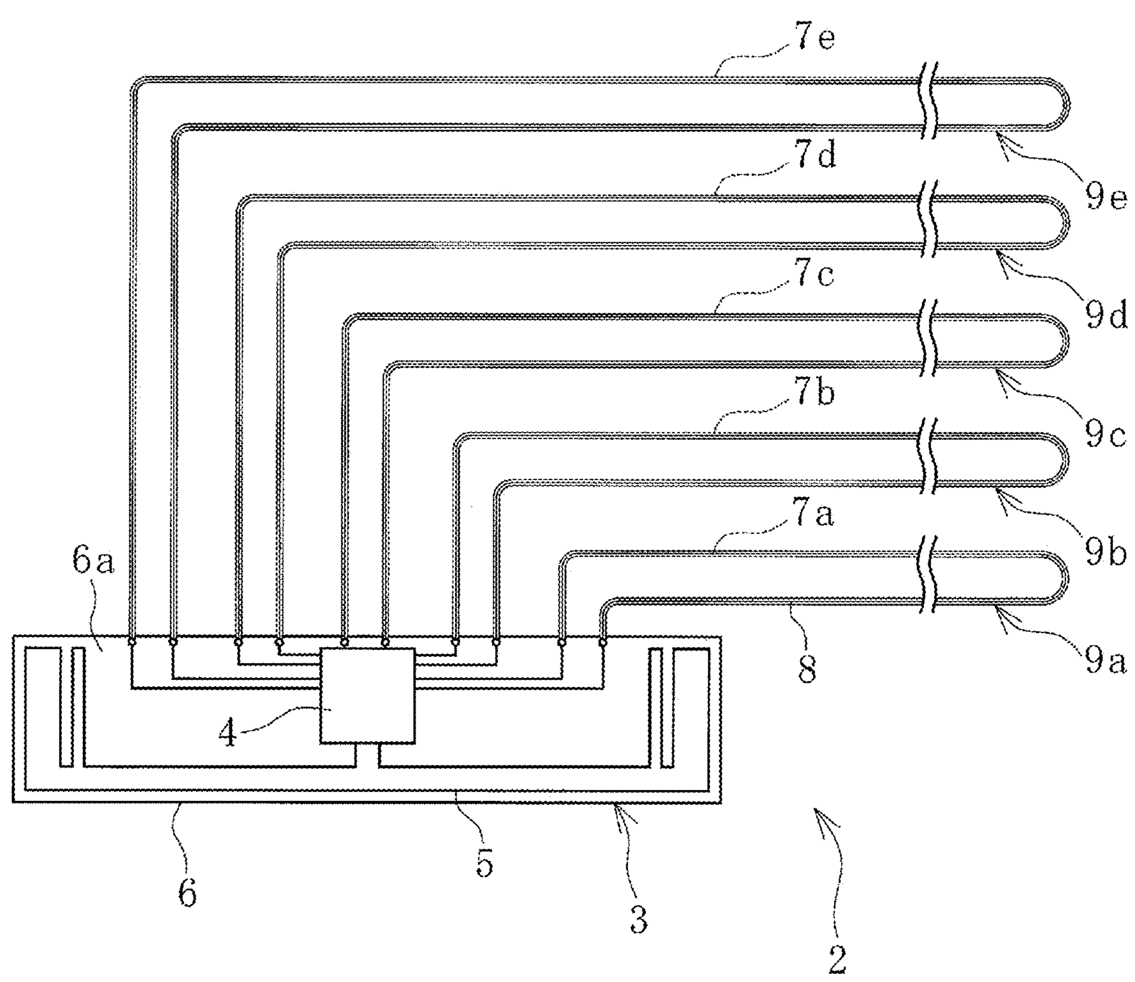
FIG. 7 is an explanatory diagram illustrating a modified example of the embedded body in a plan view.

The embedded body 2 illustrated in FIG. 7 may be used. The embedded body 2 is configured such that a plurality of (five) detection elements 7*a* to 7*e* is connected to one IC tag 3. The outer peripheral surface of each of the detection elements 7*a* to 7*e* is covered by the insulator 8. The detection elements 7*a* to 7*e* respectively form independent loop circuits 9*a* to 9*e*. Thus, a plurality of (five) independent loop circuits 9 is connected to one IC tag 3.

Figure 8:
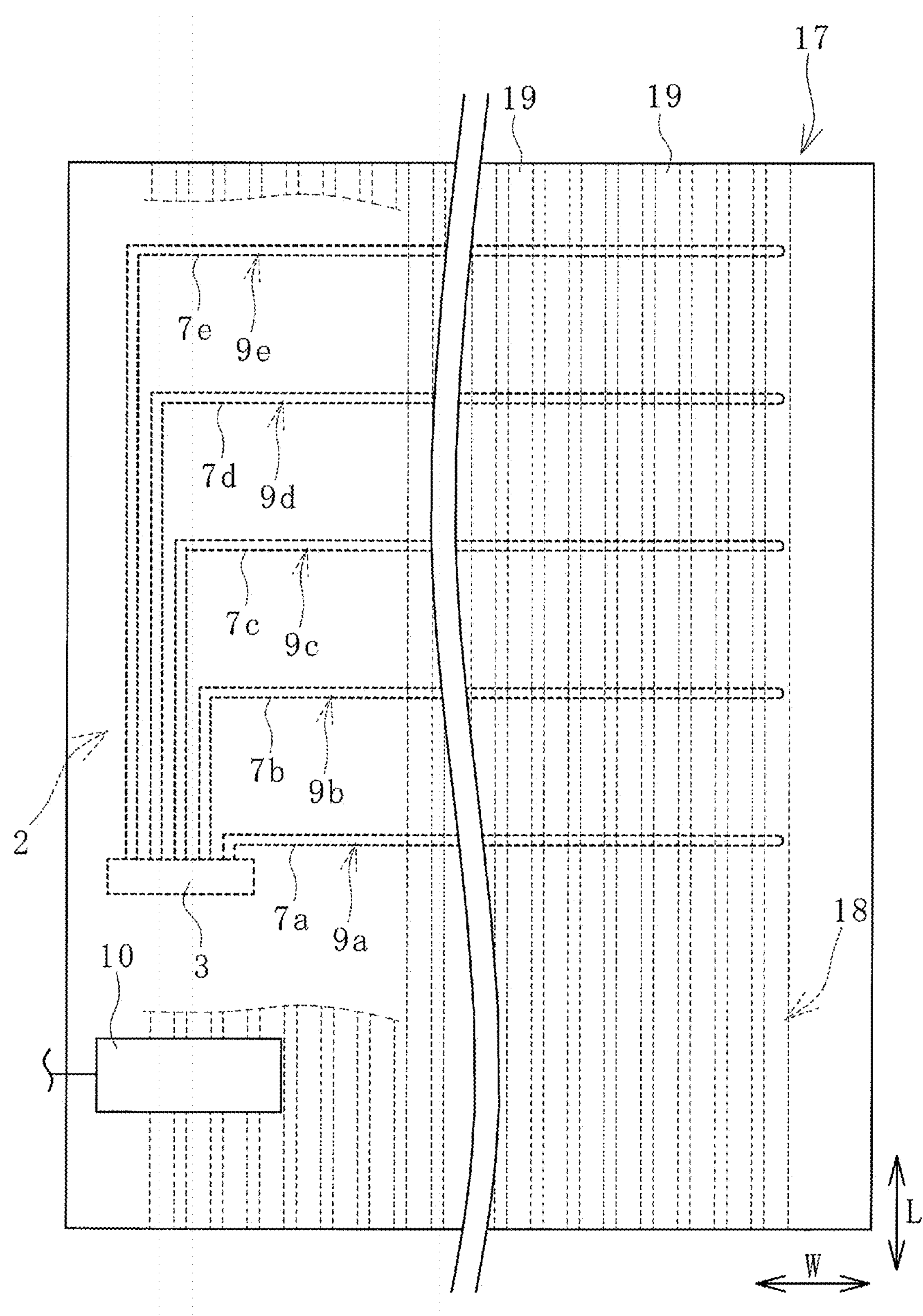
FIG. 8 is an explanatory diagram illustrating the conveyor belt in which the embedded body of FIG. 7 is embedded in a plan view.

As illustrated in FIG. 8, the embedded body 2 is embedded such that the independent loop circuits 9*a* to 9*e* are disposed at intervals in the longitudinal direction L of the conveyor belt 17. In addition, the steel cord 19 is omitted in a partial range in FIG. 8. The embedding intervals in the longitudinal direction L between the independent loop circuits 9*a* to 9*e* are be set to be, for example, in the range of 1 m or more and 3 m or less, and the embedding intervals are preferably equal to each other.

When this embedded body 2 is used, the range in which a longitudinal tear can be detected by one embedded body 2 can be extended (lengthened) as compared with the embedded body 2 illustrated in FIG. 5. Thus, it is advantageous to reduce the number of embedded bodies 2 embedded in the entire conveyor belt 17.

REFERENCE SIGNS LIST

1 Detection device
2 Embedded body
3 IC tag
4 IC chip
5 Antenna unit
6 Substrate
6*a* Insulating layer
7 (7*a*, 7*b*, 7*c*, 7*d*, 7*e*) Detection element
8 Insulator
9 (9*a*, 9*b*, 9*c*, 9*d*, 9*e*) Loop circuit
10 Detector
11 Transmission unit
12 Reception unit
13 Calculation unit
14 Warning device
15 Conveyor device
15*a*, 15*b* Pulley
16 Support roller
17 Conveyor belt
18 Core layer
19 Steel cord
20 Upper cover rubber
21 Lower cover rubber
C Conveyed object

The invention claimed is:

1. A device for detecting a longitudinal tear in a conveyor belt, the device comprising:

an embedded body embedded in the conveyor belt;

a detector configured to wirelessly communicate with the embedded body without contacting the conveyor belt; and a calculation unit connected to the detector;

the embedded body comprising an integrated circuit (IC) tag that is passive and a detection element connected to the IC tag, extending in a width direction of the conveyor belt outside the IC tag to form a loop circuit, and having a linear shape, in the calculation unit, at least position data in a longitudinal direction in the conveyor belt is stored in association with tag unique information for specifying the IC tag as embedded position data of the IC tag in the conveyor belt and further, at least position data in the longitudinal direction in the conveyor belt is stored in association with element identification information for specifying detection element as position information for the IC tag to which the detection element forming the loop circuit is connected, the detector being configured to emit a transmission radio wave toward the IC tag, and the calculation unit is configured to determine presence or absence of energization of the loop circuit by using information transmitted from the IC tag to the detector via a return radio wave emitted from the IC tag in response to the transmission radio wave, and in accordance with this determination result, presence or absence of generation of a longitudinal tear in the conveyor belt in a range where the loop circuit is embedded being detected, and the tag unique information of the IC tag connected to the loop circuit being healthy and the element identification information of the detection element forming the loop circuit are transmitted via the return radio wave and received by the detector.

2. The device for detecting a longitudinal tear in a conveyor belt according to claim 1, wherein the detection element is conductive rubber, conductive paste, or a metal wire and extends in an inclined manner in the front-back direction with respect to the width direction of the conveyor belt.

3. The device for detecting a longitudinal tear in a conveyor belt according to claim 1, wherein a plurality of the loop circuits that are independent is connected to the IC tag, and the loop circuits that are independent are each embedded at intervals in a longitudinal direction of the conveyor belt.

4. The device for detecting a longitudinal tear in a conveyor belt according to claim 1, wherein a core layer of the conveyor belt is made up of a large number of steel cords disposed side by side in the width direction, and an embedding direction of the IC tag is set to a specific direction in which an intensity of the return radio wave received by the detector is higher than a predetermined threshold value.

5. The device for detecting a longitudinal tear in a conveyor belt according to claim 2, wherein a plurality of the loop circuits that are independent is connected to the IC tag, and the loop circuits that are independent are each embedded at intervals in a longitudinal direction of the conveyor belt.

6. The device for detecting a longitudinal tear in a conveyor belt according to claim 2, wherein a core layer of the conveyor belt is made up of a large number of steel cords disposed side by side in the width direction, and an embedding direction of the IC tag is set to a specific direction in which an intensity of the return radio wave received by the detector is higher than a predetermined threshold value.

7. The device for detecting a longitudinal tear in a conveyor belt according to claim 3, wherein a core layer of the conveyor belt is made up of a large number of steel cords disposed side by side in the width direction, and an embedding direction of the IC tag is set to a specific direction in which an intensity of the return radio wave received by the detector is higher than a predetermined threshold value.

8. A method for detecting a longitudinal tear in a conveyor belt using an embedded body embedded in the conveyor belt, a detector configured to wirelessly communicate with the embedded body without contacting the conveyor belt, and a calculation unit connected to the detector, the embedded body comprising an integrated circuit (IC) tag that is passive and a detection element connected to the IC tag, extending in a width direction of the conveyor belt outside the IC tag to form a loop circuit, and having a linear shape, the method comprising:

in the calculation unit, storing at least position data in a longitudinal direction in the conveyor belt in association with tag unique information for specifying the IC tag as embedded position data of the IC tag in the conveyor belt and further, storing at least position data in the longitudinal direction in the conveyor belt in association with element identification information for specifying detection element as position information for the IC tag to which the detection element forming the loop circuit is connected, emitting a transmission radio wave from the detector toward the IC tag;

determining, by the calculation unit, presence or absence of energization of the loop circuit by using information transmitted from the IC tag to the detector via a return radio wave emitted from the IC tag in response to the transmission radio wave;

detecting, in accordance with this determination result, presence or absence of generation of a longitudinal tear in the conveyor belt in a range where the loop circuit is embedded; and transmitting the tag unique information of the IC tag connected to the loop circuit being healthy and the element identification information of the detection element forming the loop circuit via the return radio wave and the detector receiving such.

9. The method for detecting a longitudinal tear in a conveyor belt according to claim 8, a core layer of the conveyor belt being made up of a large number of steel cords side by side in the width direction, the method comprising:

grasping in advance a relationship between an embedding direction of the IC tag and an intensity of the return radio wave received by the detector;

specifying the embedding direction in which the intensity of the return radio wave received by the detector is higher than a predetermined threshold value; and embedding the IC tag in the conveyor belt in the embedding direction specified.

* * * * *